United States Patent [19]

Kroner et al.

[11] Patent Number: 5,574,113
[45] Date of Patent: Nov. 12, 1996

[54] POLYCOCONDENSATES BASED ON ASPARTIC ACID, THEIR PREPARATION AND THEIR USE

[75] Inventors: Matthias Kroner, Eisenberg; Gunnar Schornick, Neuleiningen; Walter Denzinger, Speyer; Richard Baur, Mutterstadt; Alexander Kud, Eppelsheim; Birgit Potthoff-Karl, Ludwigshafen; Volker Schwendemann, Neustadt, all of Germany

[73] Assignee: BASF Aktiengesellschaft, Ludwigshafen, Germany

[21] Appl. No.: 513,859

[22] PCT Filed: Mar. 5, 1994

[86] PCT No.: PCT/EP94/00660

§ 371 Date: Sep. 13, 1995

§ 102(e) Date: Sep. 13, 1995

[87] PCT Pub. No.: WO94/21695

PCT Pub. Date: Sep. 29, 1994

[30] Foreign Application Priority Data

Mar. 17, 1993 [DE] Germany .......................... 43 08 426.5

[51] Int. Cl.$^6$ .............................. C08F 8/30; C08F 20/62; C08F 20/66
[52] U.S. Cl. ..................... 525/327.6; 525/329.9; 562/565; 562/590; 252/180; 510/476; 510/361
[58] Field of Search .............................. 525/327.6, 329.9; 252/174.24; 562/565, 590

[56] References Cited

U.S. PATENT DOCUMENTS 3,634,543  1/1972  Sherman .
5,134,188  7/1992  Blum et al. .......................... 524/548

FOREIGN PATENT DOCUMENTS 0327698   8/1989   European Pat. Off. .
0452696  10/1991   European Pat. Off. .
2019085   6/1970   France .
9211297   7/1992   WIPO .

OTHER PUBLICATIONS

Database WPI Derwent Publications Ltd., London, GB; AN 7648999 & JP,A, 51 054 694 (Agency Of Ind Sci Tech) 14. Mai 1976.

*Primary Examiner*—Melvyn I. Marquis
*Assistant Examiner*—D. Aylward
*Attorney, Agent, or Firm*—Oblon, Spivak, McClelland, Maier & Neustadt, P.C.

[57] ABSTRACT

Polycocondensates based on aspartic acid which are obtainable by condensing aspartic acid in the presence of polymers containing carboxyl groups, which contain at least 10 mol % of a monoethylenically unsaturated carboxylic acid in copolymerized form and have a molecular weight of at least 300, in the weight ratio from 1,000:1 to 2:1, processes for preparing the polycocondensates and use of the polycocondensates in the form of the free acid groups or in a form neutralized with ammonia, amines, alkali metal or alkaline earth metal bases as an additive to detergents and cleaners, as scale inhibitors or as dispersants for finely divided solids are described.

5 Claims, No Drawings

POLYCOCONDENSATES BASED ON ASPARTIC ACID, THEIR PREPARATION AND THEIR USE

The invention relates to polycocondensates based on aspartic acid, which are obtainable by condensing aspartic acid in the presence of polymers containing carboxyl groups, processes for preparing the polycocondensates and the use of the polycocondensates as an additive to detergents and cleaners, as scale inhibitors or as dispersants for finely divided solids.

U.S. Pat. No. 3,634,543 discloses grafting copolymers of olefins having 2 to 4 carbon atoms, containing from 1 to 50 mol % of acrylic acid or methacrylic acid, with caprolactam.

WO-A-92/11297 discloses reacting copolymers of α-olefins and monoethylenically unsaturated carboxylic acids having molecular weights from 500 to 6,000 with ω-aminocarboxylic acids. The reaction products have an excellent compatibility with other polymers, in particular with polyamides.

EP-A-0 452 696 discloses aqueous solutions or dispersions of hydroxy-functional copolymers containing imide structural units, which are prepared, for example, by reacting copolymers containing anhydride groups or, if appropriate, carboxyl groups with aminoalcohols with imide formation at temperatures from 100° to 200° C., removing the water of reaction by azeotropic distillation and dissolving the polymer solution in water or dispersing it after at least partial neutralization of the carboxyl groups and, if appropriate, partially or completely removing organic solvent which is still present by azeotropic distillation. The hydroxy-functional copolymers are used for the preparation of coating compositions, sealing compositions or adhesives.

It is an object of the present invention to make available novel substances. A further object of the invention is to indicate novel additives for use in detergents and clenaers and to make available novel scale inhibitors and dispersants.

We have now found that these objects are achieved by polycondensates based on aspartic acid, which are obtainable by condensing (a) aspartic acid or polyaspartic acid in the presence of (b) polymers containing carboxyl groups, which contain at least 10 mol % of a monoethylenically unsaturated carboxylic acid in copolymerized form and have a molecular weight of at least 300, or of copolymers containing maleic anhydride groups in the weight ratio (a):(b) from 1,000:1 to 2:1.

The object is additionally achieved by a process for preparing polycocondensates based on aspartic acid when (a) aspartic acid or polyaspartic acid is condensed in the presence of (b) polymers containing carboxyl groups, which contain at least 10 mol % of a monoethylenically unsaturated carboxylic acid in copolymerized form and have a molecular weight of at least 300, or of copolymers containing maleic anhydride groups in the weight ratio (a) to (b) from 1,000:1 to 2:1.

The last-mentioned objects are achieved by the use of the polycocondensates in the form of the free acid groups or in a form neutralized with ammonia, amines, alkali metal or alkaline earth-metal bases as an additive to detergents and cleaners, as scale inhibitors or as dispersants for finely divided solids.

Components (a) which can be used for preparing the polycocondensates are L-, D- and DL-aspartic acid. DL-Aspartic acid is easily accessible industrially, eg. by reaction of ammonia with maleic acid or fumaric acid. L-Aspartic acid is obtainable, for example, by asymmetric L-aspartase-catalyzed addition of ammonia to fumaric acid. Preferably, L- and DL-aspartic acid or mixtures of these isomers are used for preparing the polycocondensates.

Suitable components (b) are polymers containing carboxyl groups, which contain at least 10 mol % of a monoethylenically unsaturated carboxylic acid in copolymerized form and have a molecular weight of at least 300. These polymers can be homopolymers of monoethylenically unsaturated carboxylic acids or copolymers of these carboxylic acids with other monoethylenically unsaturated monomers copolymerizable therewith or copolymers of at least 2 monoethylenically unsaturated carboxylic acids or anhydrides. Suitable monoethylenically unsaturated carboxylic acids preferably contain 3 to 8 carbon atoms in the molecule, eg. acrylic acid, methacrylic acid, maleic acid, maleic anhydride, fumaric acid, crotonic acid, citraconic acid, aconitic acid, methylenemalonic acid, methylenesuccinic acid, ethylacrylic acid and itaconicic acid. Preferred polymers containing carboxyl groups are, for example, homopolymers of maleic acid, acrylic acid and methacrylic acid and also copolymers of acrylic acid and methacrylic acid in any desired ratio and copolymers of acrylic acid and maleic acid, eg. in the molar ratio from 10:90 to 90:10. The molecular weight of the homo- and copolymers which are employed as component (b) is from 300 to 250,000 and is preferably in the range from 350 to 100,000. The homo- and copolymers of the monoethylencially unsaturated carboxylic acids can be prepared according to all known processes by polymerizing the monomers in aqueous medium or in an organic solvent in the presence of radical-forming initiators. In principle, all known processes for substance, solution, emulsion and precipitation polymerization are suitable for preparing the polymers. Preferably, polymers prepared by solution polymerization processes in water at temperatures from 50° to 180° C. in the presence of radical-forming initiators or polymers prepared by substance polymerization at from 180° to 350° C. are employed as component (b). Thus, for example, copolymers of acrylic acid and maleic anhydride having molecular weights from 300 to 30,000 are obtained by adding acrylic acid and maleic anhydride continuously to a high-temperature reactor at from 200° to 350° C. and polymerizing therein. The polymerization can in this case be carried out in the absence or alternatively in the presence of initiators which form radicals under the polymerization conditions. As a result of the effect of water on the copolymers, the anhydride groups hydrolyze to free carboxyl groups.

Copolymers of acrylic acid and methacrylic acid are preferably prepared by solution polymerization in water according to the process known from EP-B-0 075 820 or alternatively by polymerizing in organic solvents in the presence of radical polymerization initiators.

Dimerized or oligomerized unsaturated fatty acids can also be used, which are obtainable, for example, by cycloaddition of mono- or polyunsaturated fatty acids.

If desired, the monoethylenically unsaturated carboxylic acids can be copolymerized in the presence of other monoethylenically unsaturated monomers which are copolymerizable therewith. The other monomers which are copolymerized with the monoethylenically unsaturated carboxylic acids are, if they are additionally used in the copolymerization, contained in copolymerized form in amounts from 5 to 95, preferably 10 to 90% by weight. The copolymers should contain at least 10 mol % of the ethylenically unsaturated carboxylic acids in copolymerized form. Suitable other monomers which are copolymerizable with the monoethylenically unsaturated carboxylic acids are, for example, vinyl ethers, vinyl esters, alkyl acrylates, alkyl methacrylates, styrene, N-vinylpyrrolidone, acrylamide, methacrylamide, acrylonitrile, methacrylonitrile, allyl alcohol and allyl alcohol ethoxylates, furans and olefins having 2 to 30 C atoms. Other suitable monomers are polyalkylene glycol monovinyl ethers, polyethylene glycol $C_1$–$C_{22}$-alkylvinyl ethers, N-vinylformamide and N-vinylacetamide. Copolymers which contain vinyl esters, N-vinylformamide or N-vinylacetamide in copolymerized form can be converted by hydrolysis into polymers containing vinyl alcohol and vinylamine units. Examples of suitable copolymers of monoethylenically unsaturated carboxylic acids or their anhydrides with other monoethylenically unsaturated compounds are:

copolymers of vinyl acetate and maleic acid, copolymers of vinyl acetate and acrylic acid or methacrylic acid, terpolymers of vinyl acetate, maleic acid and acrylic acid or methacrylic acid, polymers of vinyl acetate, acrylic acid and/or maleic acid, the vinyl acetate units being contained in partially or completely hydrolyzed form as vinyl alcohol units, copolymers of methacrylic acid and methyl methacrylate, copolymers of butyl acrylate and acrylic acid, copolymers of styrene and maleic anhydride, polyoleic acid, polylauric acid, graft polymers of acrylic acid and/or maleic acid to polyethylene glycols and/or polypropylene glycols, polycondensates of terephthalic acid and polyalkylene oxides with acid end groups, copolymers of vinylsulfonic acid and maleic acid, terpolymers of isobutene, maleic acid and acrylic acid, copolymers of acrylamide and acrylic acid, copolymers of acrylamide and maleic anhydride, terpolymers of acrylamide with arylic acid and maleic anhydride, copolymers of N-vinylpyrrolidone and maleic acid and/or acrylic acid, copolymers of N-vinylformamide and maleic anhydride, copolymers of N-vinylformamide and acrylic acid, terpolymers of N-vinylformamide and acrylic acid and maleic acid, copolymers of vinylamine and acrylic acid, copolymers of vinylamine and maleic acid, terpolymers of vinylamine, acrylic acid and maleic acid, terpolymers of diisobutene, maleic acid and acrylic acid, copolymers of isobutylene and maleic anhydride, copolymers of octadecene and maleic anhydride, polyethylene waxes grafted with maleic anhydride, copolymers of vinylphosphonic acid and maleic acid, copolymers of methyl vinyl ethers with maleic anhydride, copolymers of 1,4-butanediol monovinyl ether ethoxylates diethyl maleate and/or acrylic acid and/or butyl acrylate and also copolymers of diethylene glycol ethyl vinyl ether, maleic anhydride and/or acrylic acid.

The copolymers containing maleic anhydride in copolymerized form can be partially hydrolyzed prior to the reaction with aspartic acid so that the copolymers contain, for example, 10 mol % of maleic acid units. The molecular weight of the copolymers specified above is from 300 to 250,000. The homo- and copolymers described above exhibit a molecular weight distribution. The measurement specified for the distribution is customarily the ratio $M_w/M_n$, whose numerical value for these homo- and copolymers is greater than 1 and customarily in the range from 1.01 to 50.

The polycocondensates based on aspartic acid are prepared, for example, by subjecting aspartic acid and the polymers (b) jointly to polycondensation or by first polycondensing aspartic acid to give polyaspartic acid or polyaspartimide and, after addition of the polymer (b), carrying out the polycocondensation. All polycondensation techniques can be used for this purpose. Examples are solution, solid phase or melt polycondensation. In a preferred embodiment for preparing the polycocondensates according to the invention, the components (a) and (b) are employed for polycocondensation in a solution in phosphoric acid. In this procedure, condensation can be carried out in the apparatuses equipped with a stirrer which are customarily present in manufacturing plants. In the case of polycocondensation with the polymer (b), the ratio of aspartic acid to phosphoric acid can be from 1:0.1 to 1:10 and is preferably in the range from 1:1 to 1:5.

The polycocondensation of the components (a) and (b) is carried out at from 80° to 270°, preferably 120° to 250° C.

A further preparation variant consists in making a suspension or solution of the carboxyl-carrying polymer (b) and aspartic acid in water, then evaporating the water and polycocondensing the residue thermally at up to 270° C.

An elegant procedure consists in polymerizing acrylic acid and/or methacrylic acid and/or maleic acid in phosphoric acid or phosphoric acid/water mixtures by means of radicals and, treating the resulting phosphoric acid reaction solution with aspartic acid or polyaspartic acid and polycocondensing with removal of water.

Besides carboxyl groups, suitable copolymers (b) can also contain derivatives of carboxylic acids, eg. in the form of the salts, the esters, the amides, the anhydrides or the nitriles. The carboxylic acid groups of the polymers (b) react with aspartic acid. Reaction products are preferred in which 5 to 95% of the carboxylic acid groups of the polymer (b) are involved in the linkage and in which the remaining carboxylic acid groups are present either in the acid form, as an anhydride or in the form of the salt. The polycocondensates can contain structural elements in which polyaspartic acids or polyaspartimides which consist of at least 2 aspartic acid units are bonded in salt-like, imide-like or amide-like form to at least one or more of the carboxylic acid groups contained in the polymer (b). For example, in the polycocondensation of aspartic acid with polymers containing maleic anhydride groups the structure I or IV is formed and in the polycocondensation of aspartic acid with acrylic acid polymers the structures II and III can be formed:

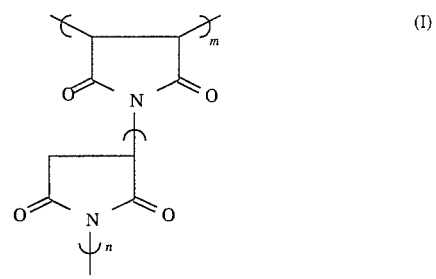

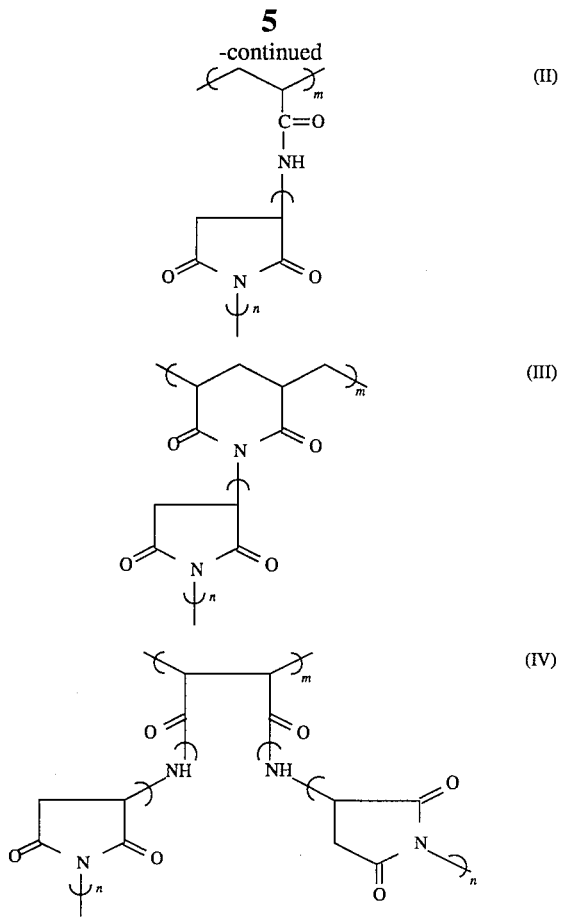

In the structures I to IV specified above, m is the proportion of the carboxylic acids in the polymer (b) which is linked to aspartic acid and n is the number of aspartic acid or aspartimide units which are grafted to the polymer (b). The components (a) and (b) are reacted in the polycondensation in a weight ratio from 1,000:1 to 2:1, preferably 100:1 to 5:1. In this process, polycocondensates are formed which in 1% strength solution in dimethylformamide have K values according to Fikentscher of from 8 to 100, preferably 9 to 60. By hydrolysis of the imide form of the polycocondensates, polyaspartic acids linked in α- and β-form can be contained in the polycocondensates. The proportion of α- and β-linked aspartic acids can be affected by the hydrolysis conditions, eg. the pH and the temperature during the hydrolysis.

The content of polymer (b) in the polycocondensates can be determined using customary spectroscopic methods.

Acrylic acid-containing polycocondensates are preferably studied by means of H-NMR spectroscopy. If, for example, a polyacrylic acid having a molecular weight of 100,000 is polycocondensed with aspartic acid, in the polycocondensate the presence of polyacrylic acid can be recognized by signals of the —CH$_2$ group from 1.0 to 2.0, and of the —CH(COOH) group at 2.5–3.0 in addition to the signals of the polyaspartimide component at 2.5–3.0, 3.0–3.5 and 5.0–5.8.

If copolymers of acrylic acid and maleic acid are used as polymer (b), the copolymerized and cocondensed acrylic acid fractions in the polycocondensates can be recognized particularly readily by means of H-NMR spectroscopy. The signals of polymaleic acid are less highly suited for identification. In these cases, C—NMR spectroscopy is better suited for structural elucidation. After the polycocondensation, the polycocondensates can be converted into the salt form by treatment with bases, eg. sodium hydroxide solution, potassium hydroxide solution, sodium hydrogen carbonate, potassium hydrogen carbonate, sodium carbonate, potassium carbonate, calcium hydroxide, barium hydroxide, ammonia or amines such as triethanolamine, monoethanolamine or trimethylamine. The polycondensates have, for example, K values from 10 to 100 (determined according to H. Fikentscher on the sodium salts of the polycocondensates in 1% strength aqueous solution at pH 7 and 25° C.).

The aspartic acid component in the polycocondensates is biodegradable in aqueous solution. In the form of poorly soluble salts, the polycocondensates are compostable and degradable.

The polycocondensates according to the invention are used in the form of the imides, the free acids and preferably in the form of the salts with alkali metal or ammonium bases as additives to detergents and cleaners, as scale inhibitors in water treatment or as dispersants for finely divided solids such as clay minerals, coal, ores, metal oxides, metal sulfides, chalk and titanium dioxide. When used as dispersants, the amounts to be used are from about 0.1 to 5% by weight, based on the finely divided solid. When used as scale inhibitors, the amounts used are as a rule from 1 to 100 ppm, based on the water to be treated. The polycocondensates to be used according to the invention in particular prevent the formation and the growth of water hardeners, in particular of calcium carbonate, calcium phosphate, barium sulfate, calcium sulfate and magnesium hydroxide.

When used as an additive in phosphate-reduced or phosphate-free detergents and cleaners, the polycocondensates according to the invention are employed in amounts from 0.1 to 30, preferably 0.5 to 10% by weight, based on the particular formulations. Phosphate-reduced detergents are understood as meaning those formulations which contain not more than 25% by weight of phosphate, calculated as sodium triphosphate. The composition of the detergent and cleaner formulations can be very different. They customarily contain from 2 to 50% by weight of surfactants and, if appropriate, builders. These details apply both to liquid and to powdered detergents and cleaners. Examples of the composition of detergent formulations which are customary in Europe, in the USA and Japan are found, for example, compiled in the form of a table in Chemical and Engineering Use, volume 67 (1989), 35. The polycocondensates according to the invention are used in the production of liquid and powdered detergents as viscosity regulators, becuase they greatly reduce the viscosity of aqueous surfactant solutions and zeolite suspensions. During washing, they display encrustation-inhibiting and dispersant action and assist the primary and secondary washing action.

In the detergent liquor, the polycocondensates according to the invention have a good dispersing power for particulate dirt, in particular for clay minerals (clay). This property is therefore important, because clay soilings of textile material are wide-spread. The polycocondensates are builders for detergents and during the washing process cause a reduction in encrustation and graying on the washed textile material. They are thus also suitable as encrustation and graying inhibitors in detergents.

Additionally, those detergent formulations are of interest which contain up to 60% by weight of an alkali metal silicate and up to 10% by weight of a polycocondensate according to the invention. Suitable alkali metal silicates are, for example, the amorphous sodium disilicates which are described in EP-A-0 444 415, and also crystalline layered silicates which according to EP-A-0 337 219 are contained in detergent formulations as builders and according to EP- B-0 164 514 are used for softening water, and sodium silicates which are obtainable by dehydrating sodium silicate solutions and drying up to water contents from 15 to 23, preferably 18 to 20% by weight.

If appropriate, detergents can additionally contain a bleaching agent, eg. sodium perborate which, if it is used, can be contained in amounts of up to 30% by weight in the detergent formulation. The polycocondensates according to the invention can additionally be used with other polymers which are customarily employed in detergents. For this purpose, the polycocondensates according to the invention can be mixed, for example, with the other polymers, eg. in the weight ratio from 1:20 to 20:1, or they can be added separately in the production of the detergents. Other suitable polymers are, for example, polyalkylene glycols, polyacetals, graft polymers of vinyl acetate or methyl acrylate to polyalkylene oxides having molecular weights of up to 100,000, which may be terminated by end groups, graft copolymers of acrylic acid or methacrylic acid and maleic acid to natural substances such as starch, degraded starches, mono- and oligosaccharides, and also copolymers of acrylic acid and maleic acid having molecular weights from 5,000 to 250,000, homopolymers of acrylic acid and methacrylic acid having molecular weights up to 200,000 and copolymers of acrylic acid and methacrylic acid having molecular weights from 2,000 to 200,000 and also polymaleic acid having molecular weights from 500 to 50,000. Other polymers which are additionally suitable are polyesters containing acid groups, pectins, pectic acid or carboxymethylcellulose.

The K values of the polycocondensates were determined in 1% strength solution in water at pH 7 and 25° C. in the Na salt form according to H. Fikentscher, Cellulose-Chemie [Cellulose Chemistry], volume 13 (1932), 58–64 and from 71 to 74. The molecular weights of the polymers b) used were determined by means of GPC. The calibration of the GPC analysis was carried out using polyacrylic acid standards which were calibrated by light-scattering measurements.

EXAMPLES 1 TO 9

26 g of the polymers specified in the table are initially introduced into a reactor of 2 l capacity and mixed with 390 g of 75% strength aqueous phosphoric acid and then treated with 266 g of aspartic acid. The reaction mixture is heated to 100° C. under a pressure of 100 mbar, water being removed from the reaction mixture by distillation. The reaction mixture is then heated to 160° C. under a pressure of 50 mbar for 2 h, the polycocondensation being completed. In most cases, a clear, homogeneous reaction mixture is formed. The polycondensate can be isolated, for example, by pouring the reaction solution into water and filtering off the residue and washing it with water until it is acid-free. The polycocondensates have the K values specified in the table. The polycocondensates 2, 3, 4, 7, 8 and 9 containing acrylic acid in copolymerized form allow the signals typical of polyacrylic acid to be recognized in the H-NMR (200 MHz, D6-dimethyl sulfoxide).

TABLE 1

| Polycocondensate | Polymer | Molecular weight of the polymers | K value of the polycocond. |
|---|---|---|---|
| 1 | Polymaleic acid | 1,000 | 21.9 |
| 2 | Copolymer of 70% acrylic acid and 30% maleic acid | 70,000 | 43.3 |
| 3 | Polyacrylic acid | 1,000 | 28.5 |
| 4 | Polyacrylic acid | 8,000 | 30.3 |
| 5 | Copolymer of maleic acid and 1,4-butanediol monovinyl ether ethoxylate with 8 ethylene oxide units | 10,000 | 25.6 |
| 6 | Copolymer of maleic acid and methyl vinyl ether | 70,000 | 38.1 |
| 7 | Modified polyacrylate acid | 4,000 | 24.1 |
| 8 | Polyacrylic acid | 50,000 | 27.6 |
| 9 | Polyacrylic acid | 100,000 | 42.3 |

The polycocondensates 1 to 9 are suitable, for example, in amounts from 5 to 7% by weight in detergents as encrustation inhibitors.

For the application of the polycocondensates in water treatment, the inhibition of calcium carbonate deposits is of prime importance. Examples are: saccharine juice evaporation, cooling circulations, sea water desalinification plants, steam generators, heating circulations, warm water circulations, heat exchangers, turbines and pumps.

Calcium carbonate inhibition (2 ppm polycocondensate concentration)

2 test solutions are prepared. Test solution 1 consists of water having a calcium hardness of 20° dH and magnesium hardness of 10° dH. Test solution 2 is an aqueous solution having a sodium carbonate hardness of 4.7° dH and sodium hydrogen carbonate hardness of 12.3° dH.

150 ml of test solution 1 and 150 ml of test solution 2, and 2 ppm of the polymer to be tested are initially introduced into a round-bottomed flask of 500 ml capacity which is equipped with a stirrer, reflux condenser and gas inlet tube and heated at 70° C. for 1 hour while passing in air (3 l/h). The contents of the flask are allowed to cool and are filtered through a fluted filter. The calcium content in the filtrate is determined by complexometric titration according to a customary method.

The results obtained in this case are indicated in Table 2. The values for the calcium ion tolerability of the polycocondensates 2 to 9 are additionally listed therein. They show stable solubility even in the presence of high calcium ion concentrations and can easily prevent the precipitation of calcium carbonate.

TABLE 2

Test for calcium carbonate inhibition:

| Example | Polycocondensate | CaCO$_3$ inhibition [%] 1 h | CaCO$_3$ inhibition [%] 2 h | Ca ion tolerability 1,000 ppm Ca$^{2+}$ 45 ppm polycocondensate [% transmission] |
|---|---|---|---|---|
| 10 | 2 | 53 | 50 | 100 |
| 11 | 3 | 54 | 50 | 100 |
| 12 | 4 | 60 | 61 | 100 |
| 13 | 5 | 59 | 57 | 100 |

TABLE 2-continued

Test for calcium carbonate inhibition:

| Example | Polycocondensate | CaCO₃ inhibition [%] 1 h | CaCO₃ inhibition [%] 2 h | Ca ion tolerability 1,000 ppm Ca$^{2+}$ 45 ppm polycocondensate [% transmission] |
|---|---|---|---|---|
| 14 | 6 | 49 | 39 | 89.7 |
| 15 | 7 | 70 | 66 | 100 |
| 16 | 8 | 64 | 64 | 100 |
| 17 | 9 | 50 | 50 | 100 |

The test for clay dispersion offers an assessment of polymers based on their use in detergents.

CD test (clay dispersion)

Finely ground china clay SPS 151 is used as a model of particulate dirt. 1 g of clay is intensively dispersed in 98 ml of water for 10 minutes in a glass jar (100 ml) with addition of a 0.1% strength sodium salt solution of the polyelectrolyte. Immediately after the stirring, a sample of 2.5 ml is taken from the center of the glass jar and the turbidity of the dispersion is determined using a turbidimeter after dilution to 25 ml. After a 30- or 60-minute standing time of the dispersion, samples are again taken and the turbidity determined as above. The turbidity of the dispersion is stated in NTU (nephelometric turbidity units). The less the dispersion settles during storage, the higher the measured turbidity values and the more stable the dispersion. The second physical measurement determined is the dispersion constant, which describes the temporal behavior of the sedimentation process. As the sedimentation process can be described approximately by a monoexponential time law, the dispersion constant τ indicates the time at which the turbidity falls to 1/e of the starting state at time t=0.

The higher a value for τ, the slower the dispersion settles. The values determined for some polycocondensates are compiled in Table 3.

TABLE 3

| Example | Polycocondensate | Turbidity in NTU t = 0 | Turbidity in NTU t = 30 [min] | Turbidity in NTU t = 60 | Dispersion constant τ [min] |
|---|---|---|---|---|---|
| 18 | 2 | 740 | 610 | 570 | 288.5 |
| 19 | 3 | 750 | 650 | 580 | 477.5 |
| 20 | 4 | 760 | 590 | 580 | 854.2 |
| 21 | 7 | 740 | 600 | 580 | 484.4 |
| 22 | 8 | 750 | 610 | 570 | 282.1 |
| 23 | 9 | 750 | 610 | 580 | 352.4 |
| Comparison example | Polyacrylic acid M = 8000 | 770 | 670 | 630 | 345.1 |

Polycondensates according to the invention are easily able to disperse solid particles and show the same action as a commercially available polyacrylic acid.

We claim:

1. A polycocondensate based on aspartic acid, consisting essentially of a polycondensate obtained by condensing
   (a) aspartic acid in the presence of
   (b) polymers containing carboxyl groups, which contain at least 10 mol % of a monoethylenically unsaturated carboxylic acid in copolymerized form and have a molecular weight of at least 300, in the weight ratio (a):(b) from 1,000:1 to 2:1.

2. A process for preparing polycocondensates based on aspartic acid, which consists essentially of condensing (a) aspartic acid or polyaspartic acid in the presence of (b) polymers containing carboxyl groups, which contain at least 10 mol % of a monoethylenically unsaturated carboxylic acid in copolymerized form and have a molecular weight of at least 300, or copolymers containing maleic anhydride groups in the weight ratio (a):(b) from 1,000:1 to 2:1.

3. A process as claimed in claim 2, wherein the polymers containing carboxyl groups employed are homopolymers of maleic acid or of acrylic acid or copolymers of acrylic acid and maleic acid, the molecular weight of the polymers being from 300 to 250,000.

4. Detergents or cleaners comprising as an additive a polycocondensate as claimed in claim 1 in the form of the free acid groups or in a form neutralized with ammonia, amines, alkali metal or alkaline earth metal bases.

5. Scale inhibitors or dispersants for finely divided solids comprising as an additive a polycondensate as claimed in claim 1 in the form of the free acid groups or in a form neutralized with ammonia, amines, alkali metal or alkaline earth metal bases.

* * * * *